(12) United States Patent
Everaerts et al.

(10) Patent No.: US 10,946,616 B2
(45) Date of Patent: Mar. 16, 2021

(54) BONDING LAYER HAVING DISCRETE ADHESIVE PATCHES

(71) Applicant: 3M INNOVATIVE PROPERTIES COMPANY, St. Paul, MN (US)

(72) Inventors: Albert I. Everaerts, Tucson, AZ (US); Fay T. Salmon, Eden Prairie, MN (US); Michael J. Wald, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 155 days.

(21) Appl. No.: 16/062,863

(22) PCT Filed: Dec. 12, 2016

(86) PCT No.: PCT/US2016/066067
§ 371 (c)(1),
(2) Date: Jun. 15, 2018

(87) PCT Pub. No.: WO2017/112438
PCT Pub. Date: Jun. 29, 2017

(65) Prior Publication Data
US 2018/0370186 A1    Dec. 27, 2018

Related U.S. Application Data

(60) Provisional application No. 62/270,811, filed on Dec. 22, 2015.

(51) Int. Cl.
*B32B 3/18*    (2006.01)
*B32B 7/14*    (2006.01)
(Continued)

(52) U.S. Cl.
CPC ............... *B32B 7/14* (2013.01); *B32B 3/18* (2013.01); *B32B 7/12* (2013.01); *C09J 7/22* (2018.01);
(Continued)

(58) Field of Classification Search
CPC .............. B32B 3/18; B32B 7/12; B32B 36/12
See application file for complete search history.

(56) References Cited

U.S. PATENT DOCUMENTS

| 5,449,540 A | 9/1995 | Calhoun |
| 8,179,381 B2 | 5/2012 | Frey |

(Continued)

FOREIGN PATENT DOCUMENTS

| EP | 2273354 | 1/2011 |
| WO | WO 2011-112590 | 9/2011 |

(Continued)

OTHER PUBLICATIONS

Cheng, "Bending Characteristics of Foldable Touch Display Panel With a Protection Structure Design", Advances in Materials Science and Engineering, 2015, pp. 1-16.

(Continued)

*Primary Examiner* — Elizabeth E Mulvaney

(57) ABSTRACT

At least some aspects of the present disclosure feature a bonding layer including a support layer and discrete adhesive patches disposed on one or both sides of the support layer. At least some aspects of the present disclosure feature a flexible display using a bonding layer including discrete adhesive patches.

16 Claims, 16 Drawing Sheets

(51) Int. Cl.
  *C09J 7/30* (2018.01)
  *B32B 7/12* (2006.01)
  *C09J 7/22* (2018.01)
  *C09J 7/24* (2018.01)
  *G09F 9/30* (2006.01)

(52) U.S. Cl.
  CPC .................. *C09J 7/241* (2018.01); *C09J 7/30* (2018.01); *B32B 2307/412* (2013.01); *B32B 2307/542* (2013.01); *B32B 2307/546* (2013.01); *B32B 2307/548* (2013.01); *B32B 2323/00* (2013.01); *B32B 2457/206* (2013.01); *B32B 2457/208* (2013.01); *C09J 2203/318* (2013.01); *C09J 2301/124* (2020.08); *C09J 2301/204* (2020.08); *C09J 2301/302* (2020.08); *G02F 2202/28* (2013.01); *G09F 9/301* (2013.01)

(56) References Cited

U.S. PATENT DOCUMENTS

| | | |
|---|---|---|
| 8,889,240 B2 | 11/2014 | Wood |
| 9,991,468 B2 | 6/2018 | Lee |
| 2010/0067257 A1 | 3/2010 | Meis |
| 2013/0260100 A1* | 10/2013 | Kelsey ............... B32B 5/30 428/166 |
| 2014/0295150 A1* | 10/2014 | Bower ............... C09J 5/00 428/201 |
| 2014/0367644 A1 | 12/2014 | Song |
| 2015/0179722 A1 | 6/2015 | Koo |
| 2015/0346408 A1 | 12/2015 | Mizutani |
| 2016/0101593 A1* | 4/2016 | Nam ............... B32B 3/04 428/213 |

FOREIGN PATENT DOCUMENTS

| | | |
|---|---|---|
| WO | WO 2014-154933 | 10/2014 |
| WO | WO 2014-197194 | 12/2014 |
| WO | WO 2014-204803 | 12/2014 |

OTHER PUBLICATIONS

International Search Report for PCT International Application No. PCT/US2016/066067, dated Mar. 15, 2017, 5 pages.

* cited by examiner

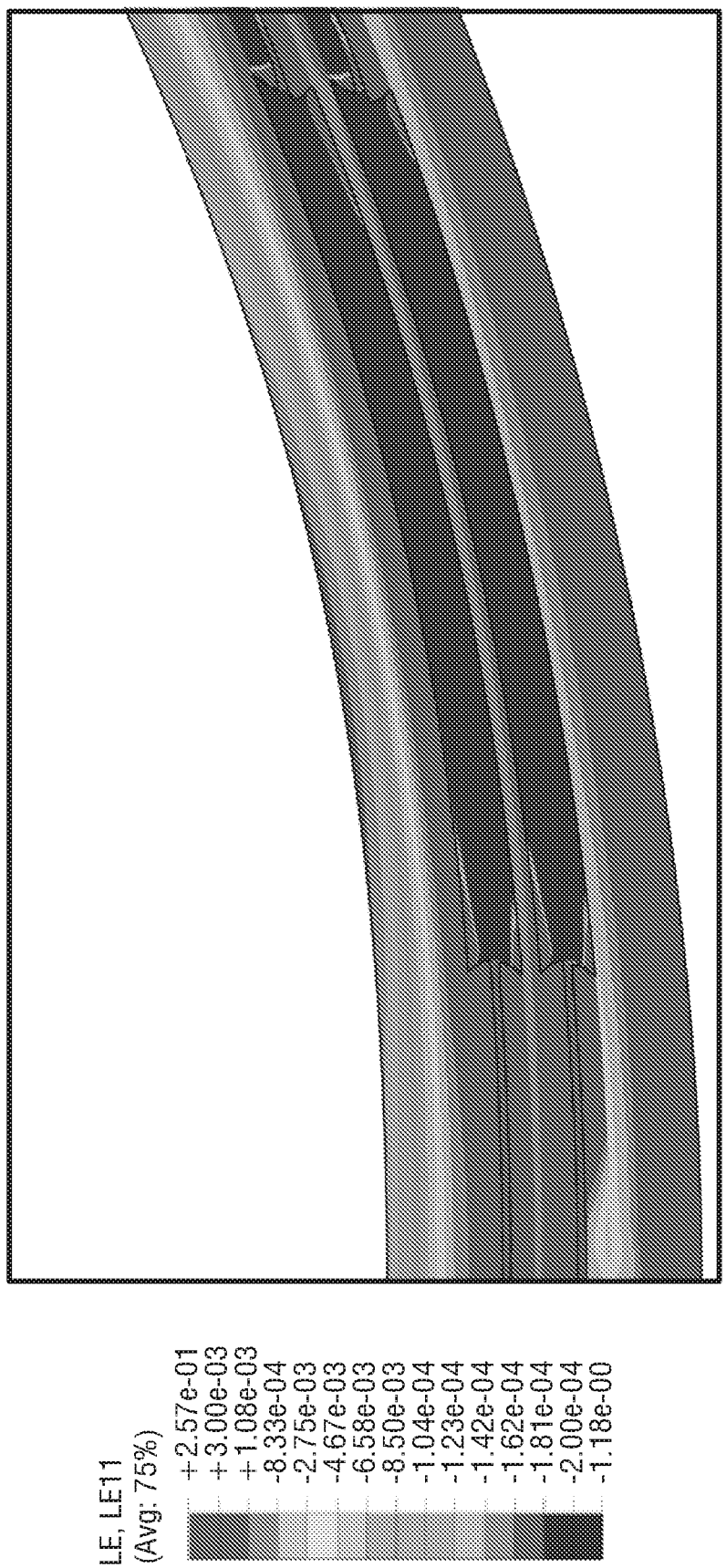

BONDING LAYER HAVING DISCRETE ADHESIVE PATCHES

CROSS REFERENCE TO RELATED APPLICATIONS

This is a national stage filing under 35 U.S.C. 371 of PCT/US2016/066067, filed Dec. 12, 2016, which claims priority to U.S. Provisional Application No. 62/270,811, filed Dec. 22, 2015, the disclosure of which is incorporated by reference in its entirety herein.

TECHNICAL FIELD

At least some aspects of the present disclosure relate to a bonding layer including discrete adhesive patches. At least some aspects of the present disclosure relate to flexible displays with bonding layers having discrete adhesive patches.

SUMMARY

At least some aspects of the present disclosure feature a bonding layer having a first surface and a second surface opposing the first surface, comprising a support layer, a first set of discrete adhesive patches, and a second set of discrete adhesive patches. Each of the first and the second set of adhesive patches comprises a plurality of adhesive patches. The first set of adhesive patches are disposed on the first surface of the bonding layer and the second set of adhesive patches are disposed on the second surface of the bonding layer.

At least some aspects of the present disclosure feature a flexible display, comprising a first layer and a second layer, and a bonding layer disposed between the first layer and the second layer. The bonding layer has a first surface and a second surface opposing the first surface. The bonding layer comprises a support layer, a first set of discrete adhesive patches, and a second set of discrete adhesive patches. Each of the first and the second set of adhesive patches comprises a plurality of adhesive patches. The first set of adhesive patches are disposed on the first surface of the bonding layer and the second set of adhesive patches are disposed on the second surface of the bonding layer.

BRIEF DESCRIPTION OF DRAWINGS

The accompanying drawings are incorporated in and constitute a part of this specification and, together with the description, explain the advantages and principles of the invention. In the drawings.

FIG. 5C is a strain graph of the display area with the configuration illustrated in FIG. 5A.

Figure 1A:
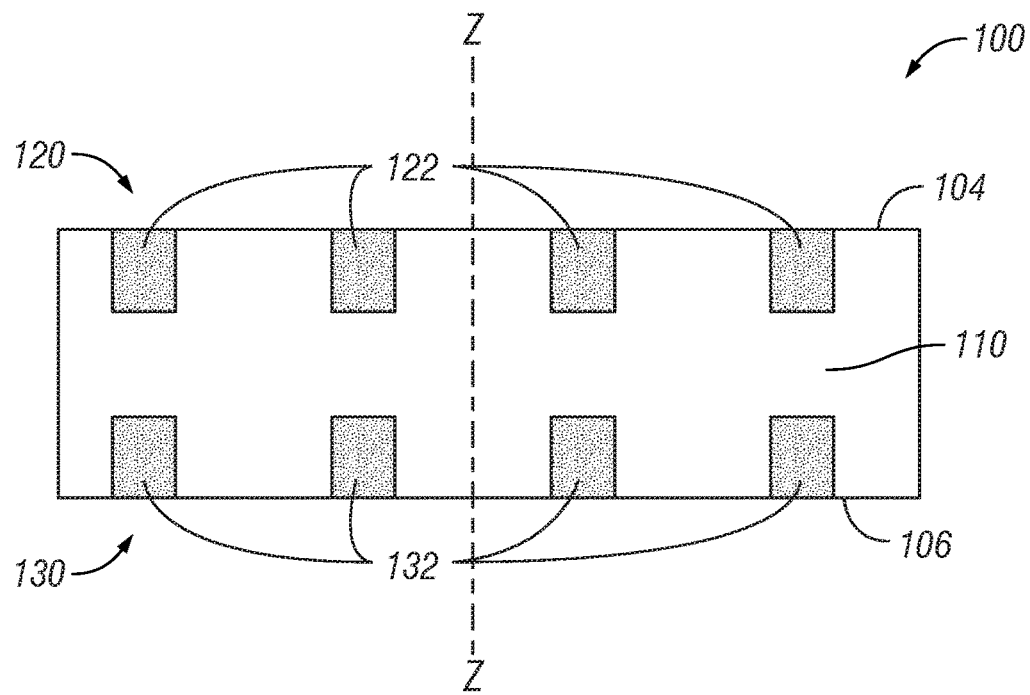
FIG. 1A illustrates a close-up conceptual view of a bonding layer.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled to" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled to," or "directly in contact with" another element, there are no intervening elements, components or layers for example. As used herein, "optically clear" refers to a material that has a luminous transmission of greater than about 90 percent, a haze of less than about 2 percent, and opacity of less than about 1 percent in the 400 to 700 nm wavelength range. Both the luminous transmission and the haze can be determined using, for example, ASTM-D 1003-95.

Some aspects of the present disclosure are directed to a bonding layer having a support layer and one or more sets of discrete adhesive patches disposed on a surface of or integrated with the support layer to provide adequate bonding strength and shear mobility. The bonding layer can be disposed between adjacent functional layers of a flexible display, for example, a base layer, a display layer, a touch device, a protection layer, or the like. In the cases that the bonding layer is located between the emissive or reflective display layer and a display viewer, the bonding layer is often designed to be optically clear. In other cases, the bonding layer may not be optically clear. Each functional layer can include one or more components. For example, the display layer can include an organic light-emitting device or other display device. As another example, the protection layer can include a touch sensitive device, a protection film, a light enhancement film, or the like. As yet another example, the base layer can include a supporting substrate, batteries, electrical circuit layer, or the like. In some embodiments, the bonding layer can be used with optical clear gel, adhesive, or liquid to improve bonding property and/or optical property.

Some aspects of the present disclosure are directed to a display, in some cases, a flexible display, having a bonding layer. When the display is bent or even folded, the bonding layer may undergo significant shear deformation. This bending or folding may happen only once, such in forming a display with rounded edges, or it may be done repeatedly in multiple directions and at different rates, such as in a foldable display device. The bending or folding radius may range from several centimeters to one millimeter, or even less. During bending or folding of a display, the bonding layer can be designed to reduce or minimize the generation of bending stress within the bonding layer, such that bending stress is not generated or is at least significantly reduced in its adjacent layer(s), for example, the protection layer, the display layer, or the like. This can be particularly important if the adjacent layers are fragile and thus susceptible to damages if a critical stress or strain is exceeded. Examples of such fragile layers in a bent or bendable display are the thin film transistor and barrier layers in the organic light-emitting diode (OLED), the conductive traces on a touch sensor, and the like.

The bending stiffness and bending stresses in a bent or folded display will be related to the layers in the display, the relative position of the layers in the multi-layer optical display stack, the mechanical coupling between the layers, and the thickness/modulus of each layer, including the bonding layer. To ensure low bending stiffness as well as adequate performance and minimum stresses involved in a bending event, it is preferred that the bonding layer have a sufficiently low storage or elastic modulus that is often characterized as shear storage modulus or shear modulus (G'). To further ensure that this behavior remains consistent over the expected use temperature range of such devices, a minimal change in G' value over a broad and relevant temperature range is desired. For example, it is preferred that the shear modulus is below 1 MPa, more preferably below 0.5 MPa, and most preferred below 0.4 MPa, or even below 0.1 MPa over a temperature range of −30 to 80° C. In some cases, the bonding layer is designed to have a glass transition temperature (Tg) (i.e., the temperature at which the material transitions from a rubbery state to a glassy state with a corresponding G' of typically greater than 10 MPa) outside and below this required operating temperature range. In some cases, the Tg of the bonding layer in a flexible display may be less than 10° C., more preferably less than −10° C., and most preferably less than −30° C. In some embodiments, the bonding layer includes one or more sets of discrete adhesive patches, where each set of the adhesive patches disposed on a different surface of the bonding layer. In some cases, the bonding layer includes two unconnected sets of discrete adhesive patches (i.e., a majority of patches in the two sets having no connection or overlap), where each set is disposed on an opposing surface of the bonding layer.

Figure 1B:
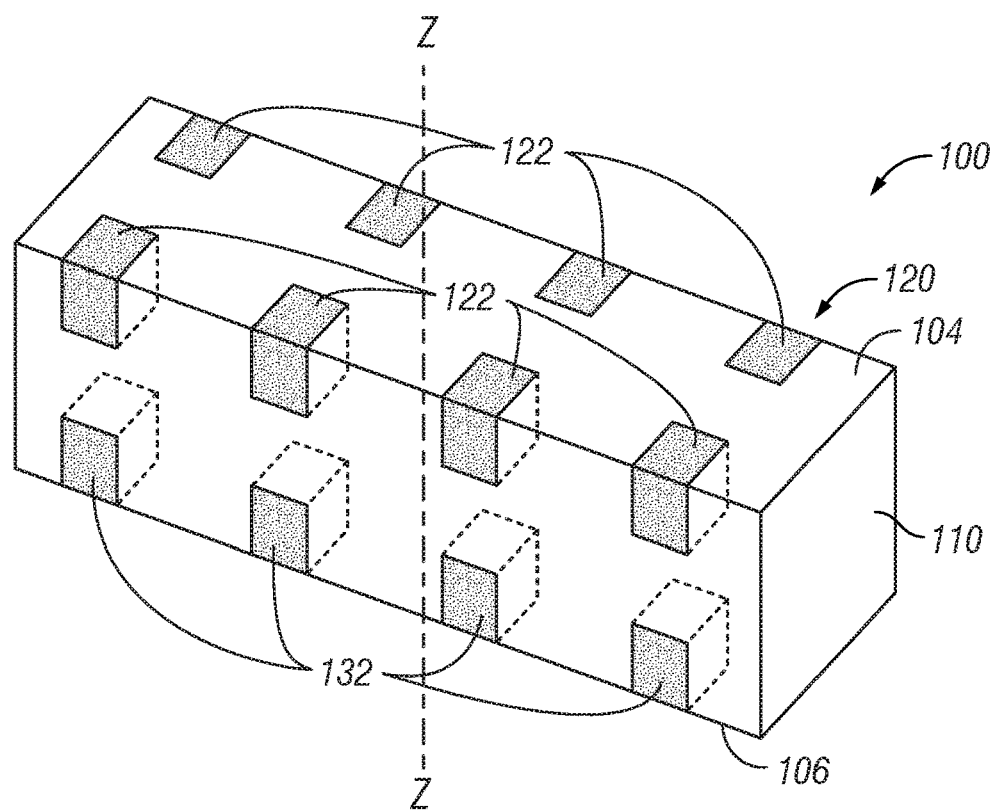
FIG. 1B illustrates a perspective view of the bonding layer illustrated in FIG. 1A.

FIG. 1A illustrates a close-up conceptual view of a bonding layer 100; and FIG. 1B illustrates a perspective view of the bonding layer 100. In some cases, the bonding layer 100 is optically clear. The bonding layer 100 includes a support layer 110, a first set of discrete adhesive patches 120, and a second set of discrete adhesive patches 130. In this example, the first set 120 includes adhesive patches 122 disposed on a first surface of the bonding layer 104, and the second set 130 includes adhesive patches 132 disposed on a second surface of the bonding layer 106. The adhesive patches 122 are spaced-apart from each other, for example, with a distance of 5 microns to several millimeters between adjacent patches. The adhesive patches 132 are also spaced-apart from each other, for example, with a distance of 5 microns to several millimeters between adjacent patches. The distance between patches can be selected in relationship with the type of adhesive being used and the bond strength desired for the bonding layer. For example, for a given adhesive and surface area contacting the adjacent layer of each patch, closer spacing will increase the bond strength. Likewise, if a weaker adhesive is replaced with a stronger adhesive (for a given exposed surface area of the patch contacting the adjacent layer), a larger spacing between adhesive patches can be used without compromising the overall bond strength of the bonding layer. In some cases, adhesive patches 122 are spaced-apart from adhesive patches 132 along the Z axis that is perpendicular to the surface formed by the bonding layer 100. In some cases, none of the adhesive patches 122 is in contact with any one of the adhesive patches 132.

In some embodiments, the adhesive patches (122, 132) can be of any shapes, for example, cylindrical shapes, cubic shapes, stripes, rectangular shapes, elliptical shapes, oblong shapes, asymmetric shapes, and the like. In some cases, the first set of adhesive patches 120 and/or the second set of adhesive patches 130 include patches of generally same shapes. In other cases, the first set of adhesive patches 120 and/or the second set of adhesive patches 130 include patches having various shapes. In some cases, the first set of adhesive patches 120 and/or the second set of adhesive patches 130 include patches of generally same sizes. In some cases, the first set of adhesive patches 120 and/or the second set of adhesive patches 130 include patches having various sizes. In some cases, the first set of adhesive patches 120 include patches having the same shapes of patches in the second set of adhesive patches 130. In some cases, the first set of adhesive patches 120 include patches having different shapes of patches in the second set of adhesive patches 130, for example, patches 122 having cylindrical shapes, and patches 132 having cubic shapes. In some cases, the first set of adhesive patches 120 have patches having different sizes of patches in the second set of adhesive patches 130. In some cases, the first set of adhesive patches 120 and/or the second set of adhesive patches 130 may include patches of a same type of adhesive. In some other cases, the first set of adhesive patches 120 and/or the second set of adhesive patches 130 may include patches of various types of adhesive.

In some embodiments, the adhesive patches (122, 132) and the support layer 110 can use materials that are optically clear, for example, material with visible light transmission at least 90% and haze less than 2%. Example materials for the support layer 110 include silicone elastomers, polyurethane elastomer, polyolefin elastomers, including those based on metallocene chemistry, and acrylic elastomers which can be plasticized to get softness. Some of these elastomers may be formulated with compatible liquids to make soft gels. Outside the light path, a foamed support layer may also be used. In some cases, a formed support layer may be used to diffuse lights within a light path. In some embodiments, the support layer 110 may have some adhesiveness. In such embodiments, the adhesiveness of the support layer 110 is generally demonstrated in the form of tackiness and self-wetting behavior on its adjacent functional layer(s), even under no pressure or very moderate pressure, like finger pressure. The self-wetting behavior may be beneficial by allowing temporary detachment of the support layer from the functional layers (but not the adhesive patches), which spontaneously heals itself after a bending or folding event to fully or nearly fully restore the function of the bonding layer. In some embodiments, the bond strength of the support layer to the its adjacent functional layer(s) is not sufficient to pass durability testing, for example, what is used in the display industry, such as temperature cycling, heat and humidity exposure, or the like, so the adhesiveness of the support layer generally needs to be augmented with the adhesive patches to provide sufficient bond strength. In some cases, the support layer includes an adhesive with bond strength less than 200 g/2.5 cm width when peeled from glass at 180° angle and speed of 300 mm/min using a 50 micron polyester backing to support the adhesive.

In some embodiments, the support layer 110 is not an adhesive (i.e., having high resistance to debonding). In some implementations, the support layer 110 may use a material having one or more of the properties includes: elastic, high level of elongation under moderate to low shear stresses, elastic recovery within a short time frame, little or no permanent deformation after folding or unfolding, low degradation of material property such as fracture, debonding, bubbling, hazing, optical clarity and operational in the temperature range between −30° C. and 100° C. In some cases, the support layer uses a material having a shear modulus no more than 100 kPa, preferably no more than 50 kPa, and most preferred no more than 20 kPa when measured at frequency of 1 Hz in the temperature range between −30° C. and 100° C. In some cases, the support layer 110 uses an elastomer, for example, a soft elastomer. As used herein, a soft elastomer refers to a material having a shear creep compliance (J) of at least about 6E−6 1/Pa measured at 5 seconds with an applied shear stress between about 50 kPa and about 500 kPa. In some cases, the support layer 110 may have a relative low elastic modulus to reduce resistance to bending. In some embodiments, the elastomer may be a selected elastomer with a refractive index between 1.40 and 1.60.

In some cases, the adhesive patches (122, 132) may use structural adhesive, semi-structural adhesive, heat-activated adhesive, pressure-sensitive adhesive, ultra-violet curable adhesive, or thermally curable adhesive, for example. In some cases, a curing step will be used after assembly depending on the material chosen. Example adhesive materials include acrylates (tackified or not), epoxies, acrylic/epoxy hybrids, tackified synthetic rubbers, acrylic block copolymers, silicones, polyesters, polyamides, and polyurethanes, or the like.

In some embodiments, the bonding layer 100 has a thickness no more than 5 mm. In some cases, the bonding layer 100 has a thickness no more than 1 mm. In some cases, the bonding layer 100 has a thickness no more than 200 microns. In some cases, the bonding layer 100 has a thickness no more than 100 microns. In some cases the bonding layer is at least 1 micron thick. In some cases, the bonding layer is at least 3 microns thick. In some cases the bonding layer is at least 5 microns thick. In some embodiments, each of the first set and/or the second set of discrete adhesive patches (120, 130) has a thickness of at least 5 microns but less than the thickness of the bonding layer. In some implementations, the adhesive patches (122, 132) cover at least 5% of a surface (104 and/or 106) of the bonding layer 100. In some implementations, the adhesive patches (122, 132) cover no more than 95% of a surface (104 and/or 106) of the bonding layer 100. In some embodiments, the set of discrete adhesive patches (120, 130) can use a material that has a refractive index closely matching the refractive index of the support layer 110. In such cases, the optical clarity of the support layer 110 can be maintained without visible patterns. In some cases, the set of discrete adhesive patches (120, 130) uses adhesive with an overall refractive index that has an absolute difference less than or equal to 0.05 from the refractive index of the part of support layer 110.

Figure 2:
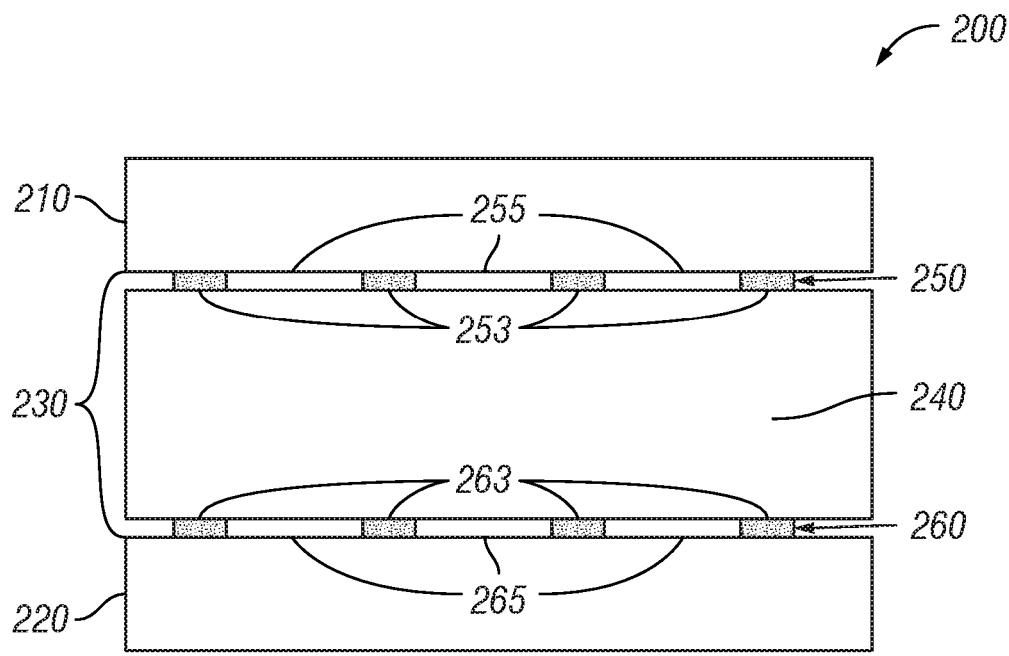
FIG. 2 illustrates a flexible display having a bonding layer.

FIG. 2 illustrates a flexible display 200 having a bonding layer 230. The display 200, as illustrated, includes a first layer 210 and a second layer 220 and a bonding layer 230 disposed between the two layers (210, 220). In some cases, the bonding layer 230 can be optically clear. In some cases, the bonding layer 230 is disposed in the view path (i.e., layer(s) closer to a viewer than a display layer in the display). The bonding layer 230 can use any embodiments of the bonding layers described herein. In some embodiments, the bonding layer 230 includes a support layer 240, a first adhesive layer 250, and a second adhesive layer 260. The display may include other layers besides layers 210 and 220.

In some embodiments as illustrated, the first adhesive layer 250 includes a set of discrete adhesive patches 253 and an optical coupler 255 disposed proximate to the adhesive patches. The second adhesive layer 260 includes a set of discrete adhesive patches 263 and an optical coupler 265 disposed proximate to the adhesive patches. In some cases, the optical coupler (255, 265) includes materials that have relatively low elastic modulus, and may undergo a high degree of shear strain under low shear stress to facilitate the repeated bending, for example, liquid, adhesive, gel, or the like. As an example, the optical coupler (255, 265) can include a low viscosity liquid to reduce resistance to bending.

In some embodiments, the optical coupler (255, 265) can use a material that has a refractive index closely matching the refractive index of the adhesive patches (253, 263). In such cases, the optical clarity of the bonding layer 230 can be maintained by eliminating the air gaps between the adhesive patches (253, 263). In some cases, the optical coupler (255, 265) can have an overall refractive index that has an absolute difference less than or equal to 0.05 from the refractive index of the adhesive patches (253, 263) within the viewing area. In some cases, optionally, the optical coupler (255, 265) can have an overall refractive index that has an absolute difference less than or equal to 0.05 from the refractive index of the support layer 240. For example, the optical coupler (255, 265) can include materials such as, for example liquids like mineral oil, silicone oil, liquids containing phenyl and phosphorus groups such as Santicizer 141 (available from Ferro, USA), or gels formulated using such liquids in combination with elastomers using monomers containing higher refractive index contributing functional groups such as aromatic groups like phenyl, naphtyl, anthracyl, sulfur groups, bromine groups, or the like, to control and adjust the optical index of the gel.

Figure 3A:
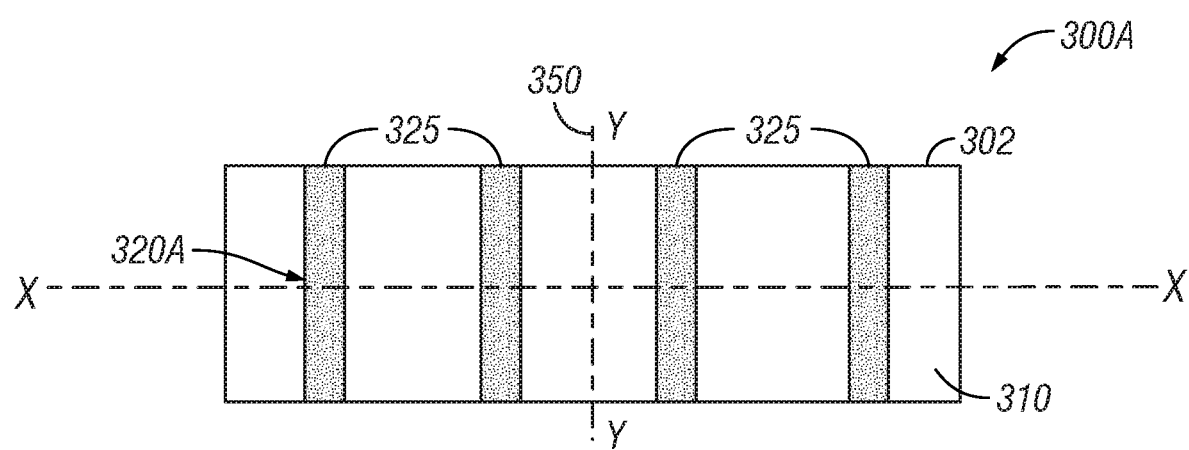
FIGS. 3A-3E illustrate some conceptual examples of bonding layers.

FIGS. 3A-3E illustrate some conceptual examples of bonding layers. FIG. 3A is a top view of a conceptual example of a bonding layer 300A. In some cases, the bonding layer 300A has a support layer 310 and a set of discrete adhesive patches 320A disposed on a surface of the support layer 310. The bonding layer 300A has an X axis and a Y axis generally perpendicular to the X axis, where the bonding layer 300A is configured to bend about the Y axis. In the example illustrated, the set of adhesive patches 320A include patches in strip pattern and disposed generally parallel to the Y axis. In some cases, the set of adhesive patches 320A may include patches in strip pattern and disposed generally parallel to the X axis. In some configurations, a flexible display (not shown) may include more than two functional layers, where every two adjacent functional layers have a bonding layer in between, where the bonding layer may use any embodiments described herein. In some embodiments, the patches 325 are generally uniformly distributed across surface 302 of the assembly layer 300A. In some embodiments, the patches 325 may have different spatial distribution densities across the surface 302. In one embodiment, when the bonding layer 300A has a fold line 350, the patches 325 have higher spatial density closer to the fold line 350 than the spatial density further away from the fold line 350.

The optically clear bonding layer can be manufactured or made in many different ways. For example, the support layer can be manufactured separately and the adhesive patches can be applied on one or both surfaces of the support layer by well-known printing techniques, such as screen-printing, flexographic printing, ink jet printing, and the like. Examples of printable adhesives could be hot melt adhesives and liquid optically clear adhesives. Pattern coating such as stripe coating may also be used. Alternatively, the adhesive patches may first be applied on a release liner and then completely or partially transferred to the support layer. For example, the adhesive patches may be transferred from a segmented adhesive transfer tape described in U.S. Pat. No. 5,449,540, which is incorporated in its entirety by reference.

In some embodiments, the adhesive patches can be embedded into the surface of the support layer. For example, by applying the discrete patches of adhesive on a liner first, one can cast or extrude the support layer on such release liner (if a single side of adhesive patches is desired), or between such release liners (if adhesive patches are desired on both sides of the soft core).

If desired, one could also mix and match these processes to apply the adhesive patches. For example, one could cast the support layer on an adhesive patch coated liner and laminate or print discrete patches of adhesive to the other side, to end up with an optically clear assembly layer with surface embedded adhesive patches on one side of the support layer and raised adhesive patches on the other side of the support layer. Likewise, one could surface embed some of the adhesive patches first and apply raised patches to the same side later.

Figure 3B:
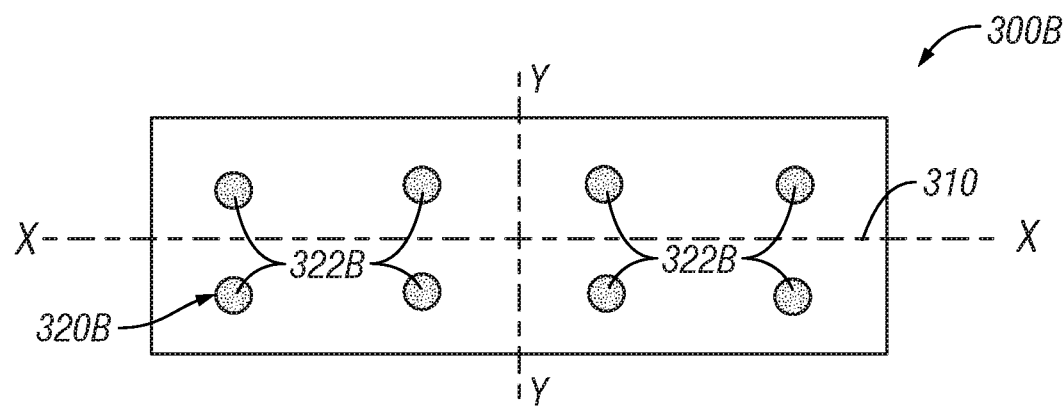

Referring to FIG. 3B, a top view of a bonding layer 300B having a support layer 310 and a set of discrete adhesive patches 320B disposed on a surface of the support layer 310. The set of discrete adhesive patches 320B may include patches 322B in a dot pattern from the top view, where the patches may have cylindrical shapes or semi-sphere shapes, for example. In some cases, the patches may have a generally same cross sectional shape. In some embodiments, the patches may form rows and columns. In some cases, the patches forming rows and columns generally parallel to X axis and Y axis. In some cases, the patches may also be randomized across the surface of the bonding layer, for example to reduce the risk of Moire effect.

Figure 3C:
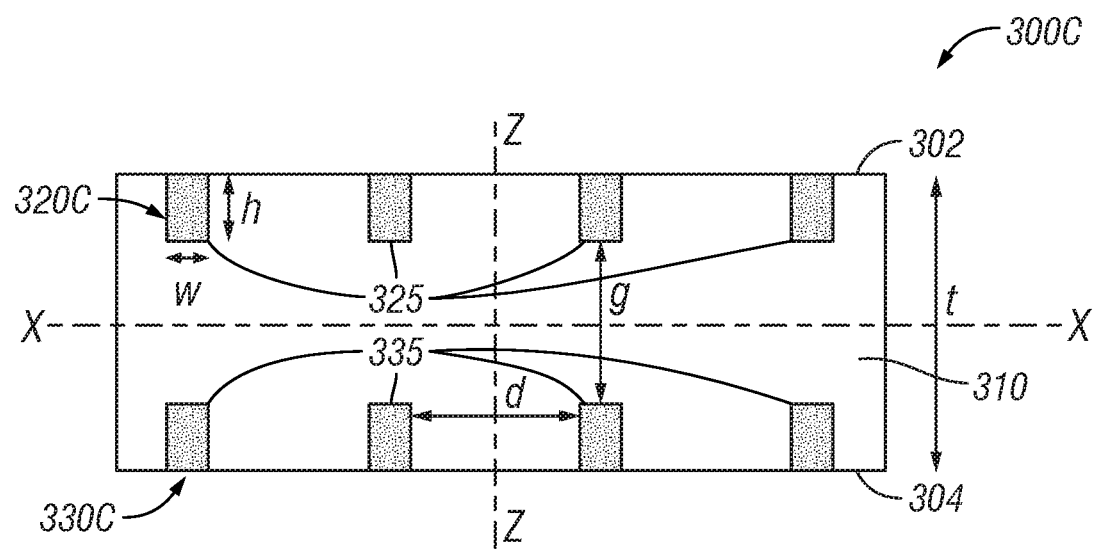
Figure 3D:
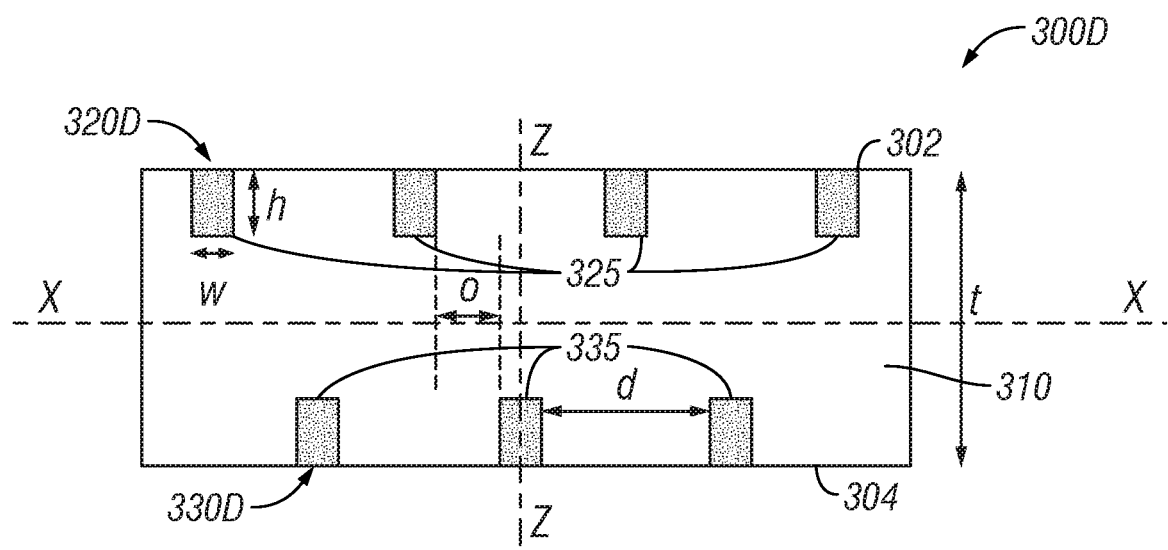
Figure 3E:
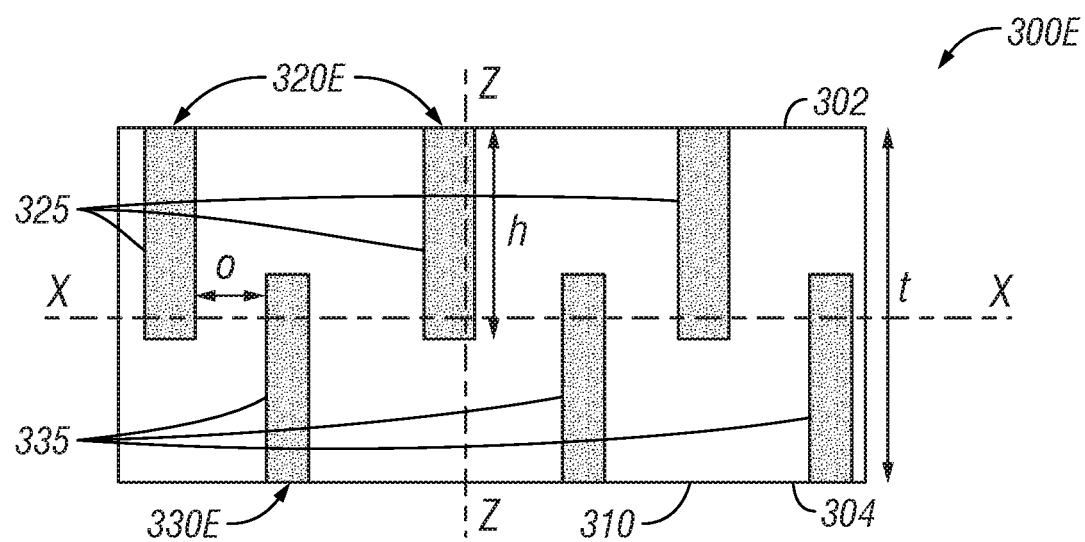

FIGS. 3C, 3D, and 3E illustrate cross-sectional views of conceptual examples of bonding layers. Referring to FIG. 3C, the bonding layer 300C with a thickness t has a support layer 310, a first set of discrete adhesive patches 320C disposed on a first surface 302 of the bonding layer 300C, a second set of discrete adhesive patches 330C disposed on a second surface 304 of the bonding layer 300C. In this example, the patches 325 included in the first set of adhesive patches 320C are generally aligned with the patches 335 included in the second set of adhesive patches 330C. In some examples, the patches 325 and 335 have a width w in the range of 5 microns to 5 mm, a height h in the range of 5 microns to up to a few microns less than the bonding layer thickness. Further, adjacent patches have a distance d between them in the range of 5 microns to several millimeters. Additionally, a patch 325 and its corresponding patch 335 have a gap g in the range of 5 microns to 95% of the bonding layer thickness.

FIG. 3D illustrates a bonding layer 300D with a thickness t having a support layer 310, a first set of discrete adhesive patches 320D disposed on a first surface 302 of the bonding layer 300D, a second set of discrete adhesive patches 330D disposed on a second surface 304 of the bonding layer 300D. In this example, the patches 325 included in the first set of adhesive patches 320D are not aligned with the patches 335 included in the second set of adhesive patches 330D. Instead, a patch 325 has an offset o from a corresponding patch 335. In some cases, the offset o is one-half of the distance d of adjacent patches. FIG. 3F illustrates a bonding layer 300E similar to the one illustrated in FIG. 3D, except the adhesive patches 325, 335 in the sets of adhesive patches 320E, 330E have greater height. In one embodiment, the adhesive patches 325, 335 have a height h greater than one half the thickness t of the bonding layer 300E.

Figure 4:
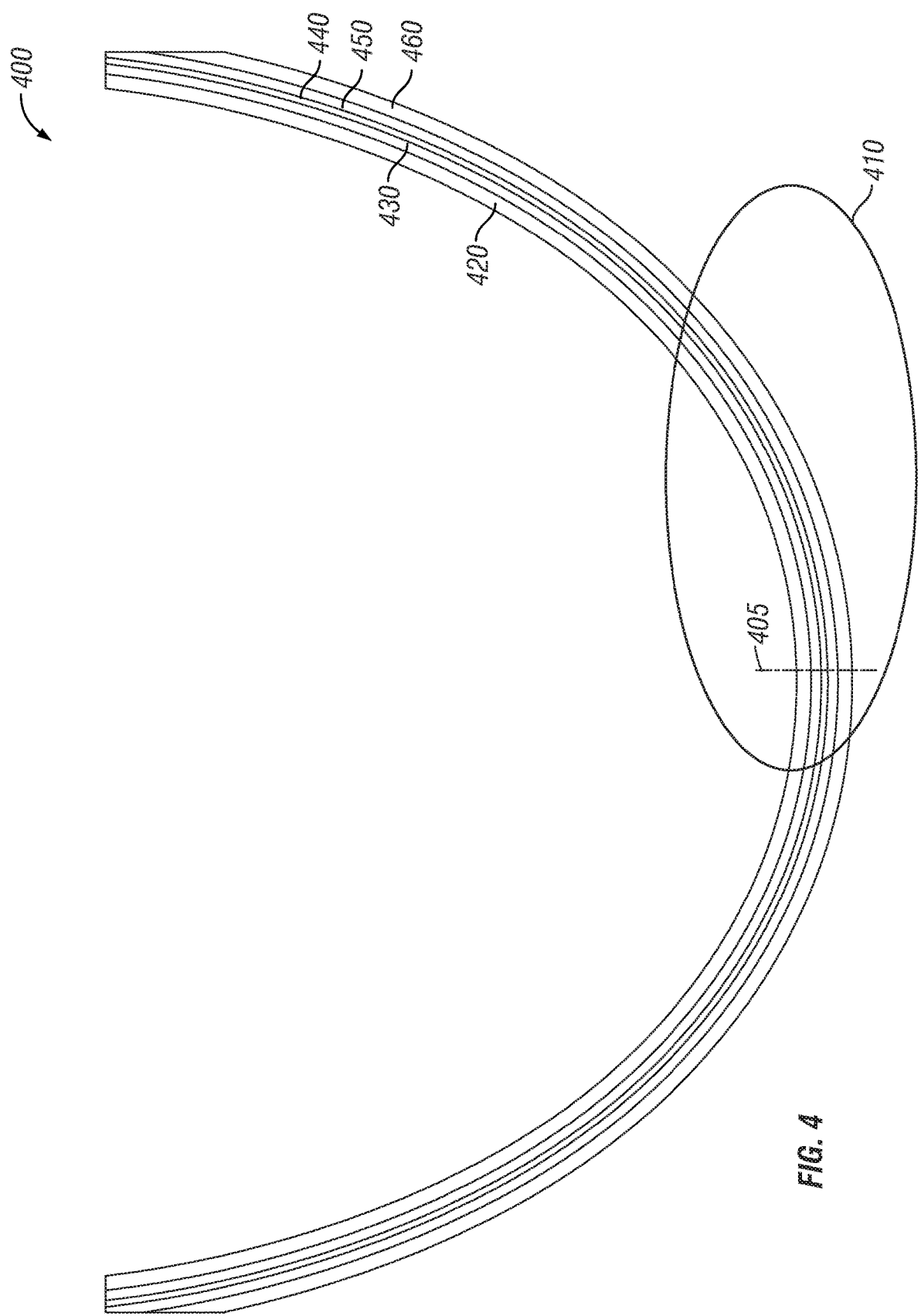
FIG. 4 illustrates a cross-sectional view of one example of a display.

A flexible display may have a plurality of functional layers including the display layer and a plurality of bonding layers. FIG. 4 illustrates a cross-sectional view of one example of a display 400. The display 400 has a first layer 420, a first bonding layer 430, a middle layer 440, a second bonding layer 450, and a second layer 460. The middle layer 440 can include, for example, a touch device. The second layer 460 can be, for example, a displayer layer. The bonding layers 430, 450 can use any one of configurations of bonding layers described herein. The region 410 is the area where the flexible display 400 has high strain and the axis 405 is the axis that is perpendicular to the plane of the display surface in its flat configuration and intersecting with the bending/folding line of the display.

Figure 5A:
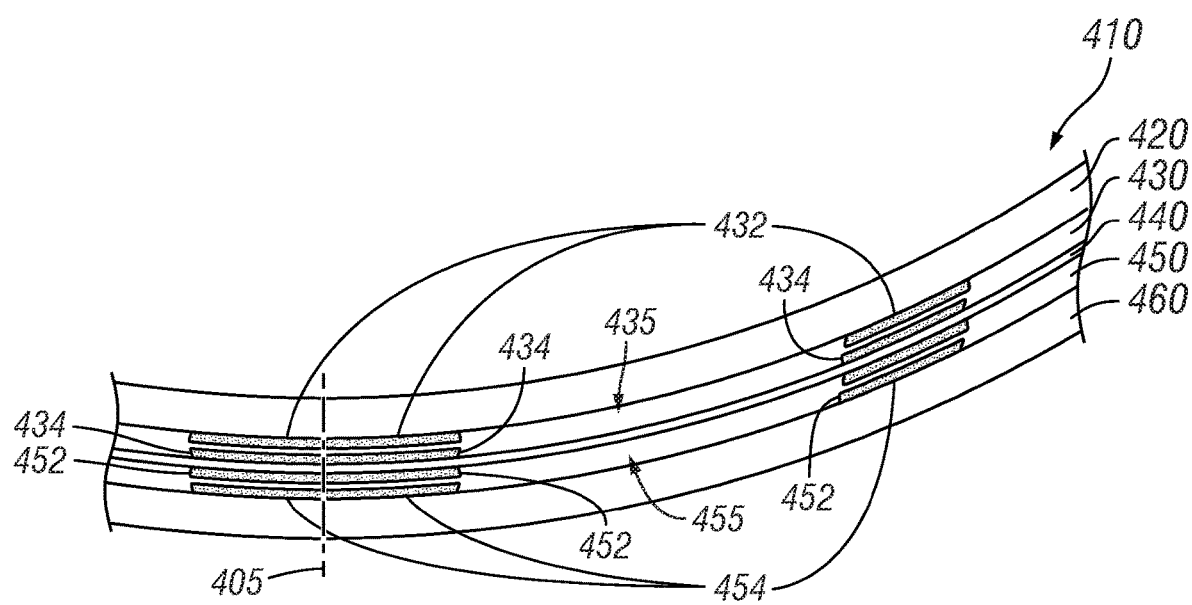
FIG. 5A is a close-up view of one example configuration of the display area in FIG. 4.
Figure 5B:
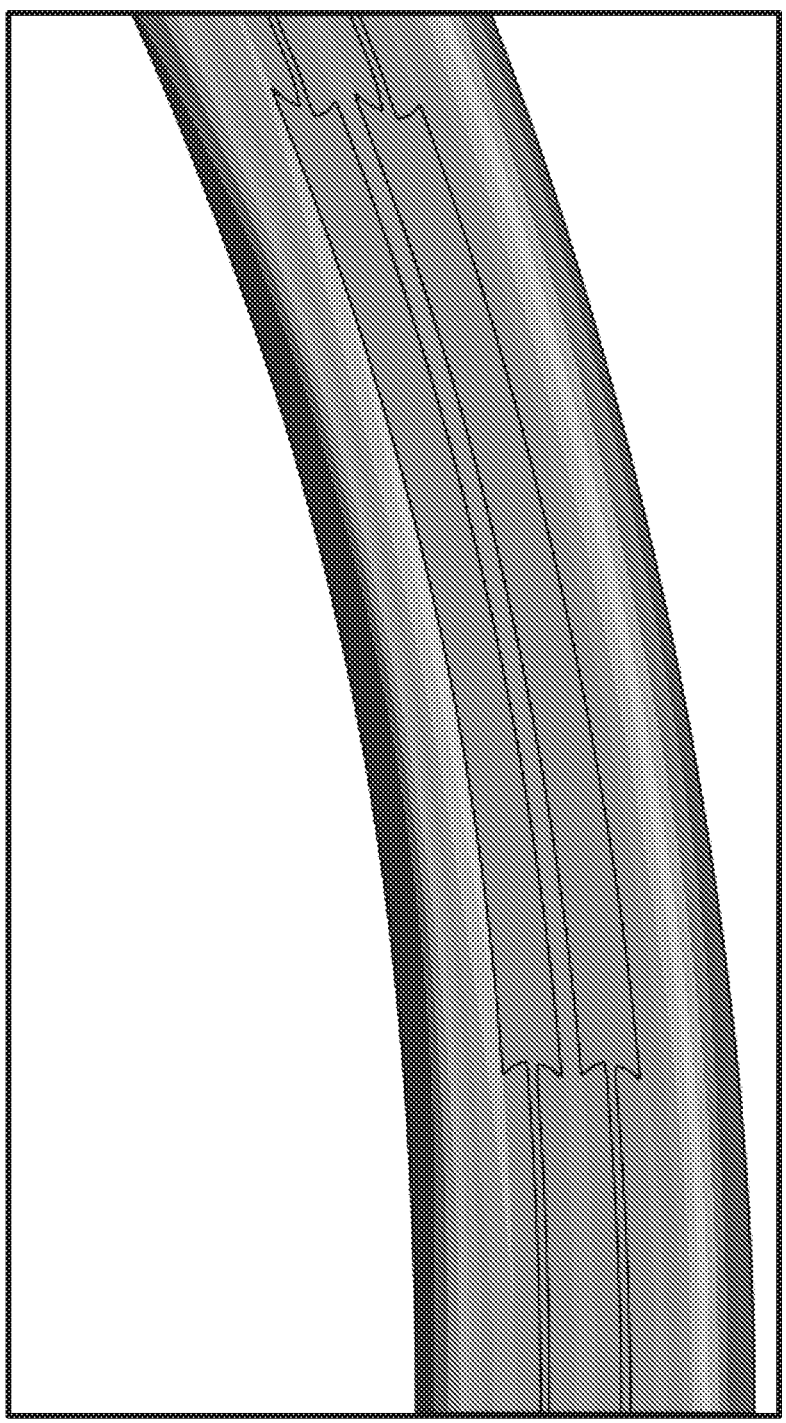
FIG. 5B is a stress graph of the display area with the configuration illustrated in FIG. 5A.
Figure 5D:
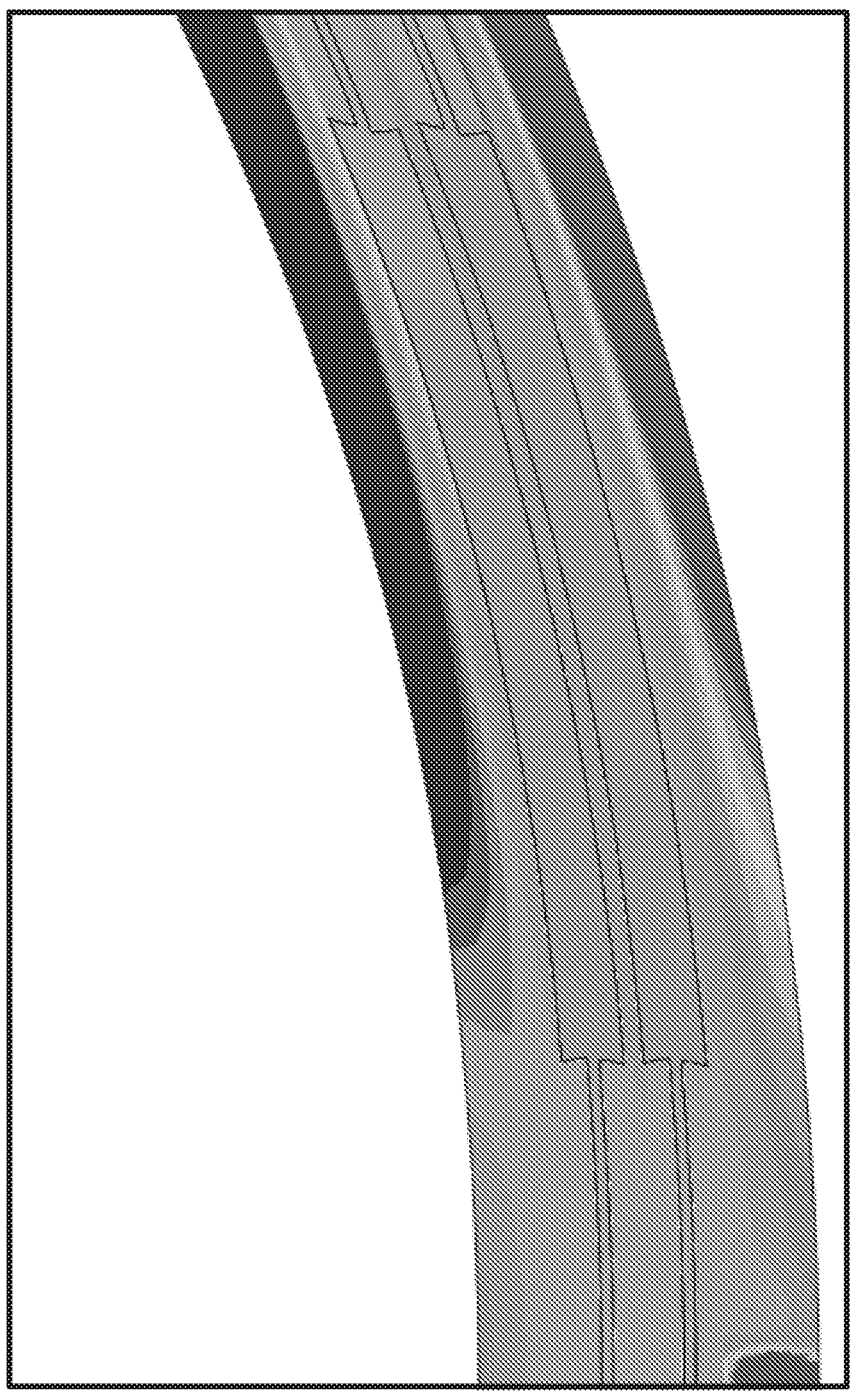
FIG. 5D is a peel stress graph of the display area with the configuration illustrated in FIG. 5A.
Figure 5E:
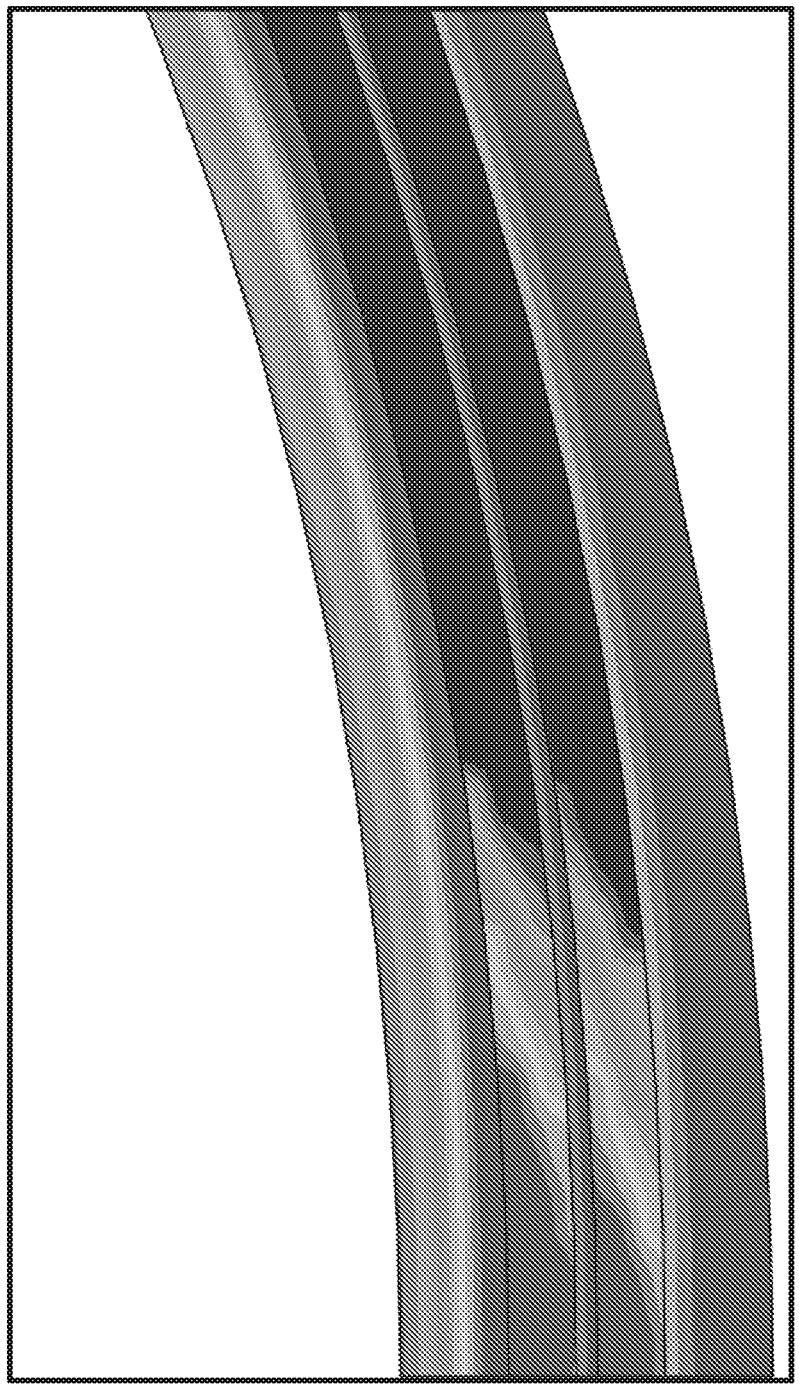
FIG. 5E illustrates a strain graph of a similar display area illustrated in FIG. 4 with a continuous adhesive layer as the bonding layer.

FIG. 5A is a close-up view of one example configuration of the display area 410 in FIG. 4. The bonding layer 430 includes a support layer 435, a first set of discrete patches 432, and a second set of discrete patches 434. In the example illustrated in FIG. 5A, the patches in the first set 432 and the second set 434 are generally aligned. The bonding layer 450 includes a support layer 455, a first set of discrete patches 452, and a second set of discrete patches 454. The patches in the first set 452 and the second set 454 are generally aligned. FIG. 5B is a stress graph of the display area 410 with the configuration illustrated in FIG. 5A; FIG. 5C is a strain graph of the display area 410 with the configuration illustrated in FIG. 5A; and FIG. 5D is a peel stress (i.e., stress perpendicular to the surface formed by the bonding layer) graph of the display area 410 with the configuration illustrated in FIG. 5A. In comparison, FIG. 5E illustrates a strain graph of a similar display area 410 with a continuous adhesive layer (e.g., using CEF2210 Optically Clear Adhesive from 3M Company) as the bonding layer. Comparing FIGS. 5C and 5E, the overall strain in the display area with a bonding layer having discrete adhesive patches is less than the overall strain in the display area with a continuous adhesive layer as the bonding layer. As an example characterized in the graphs, the support layers (435, 455) may use Optically Clear Laminating Adhesive 8141 or CEF2210 Optically Clear Adhesive from 3M Company of Saint Paul, Minn., and the adhesive patches (432, 434, 452, 454) may use Optically Clear Adhesive 8180 from 3M Company.

Figure 6A:
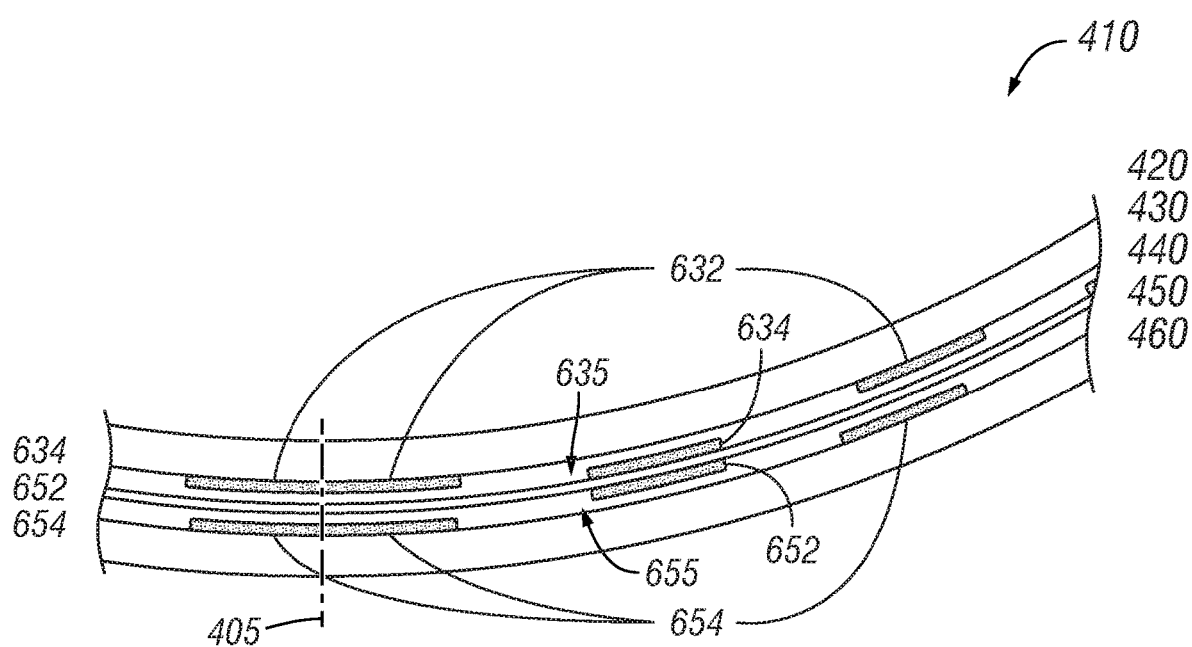
FIG. 6A is a close-up view of another example configuration of the display area in FIG. 4.
Figure 6B:
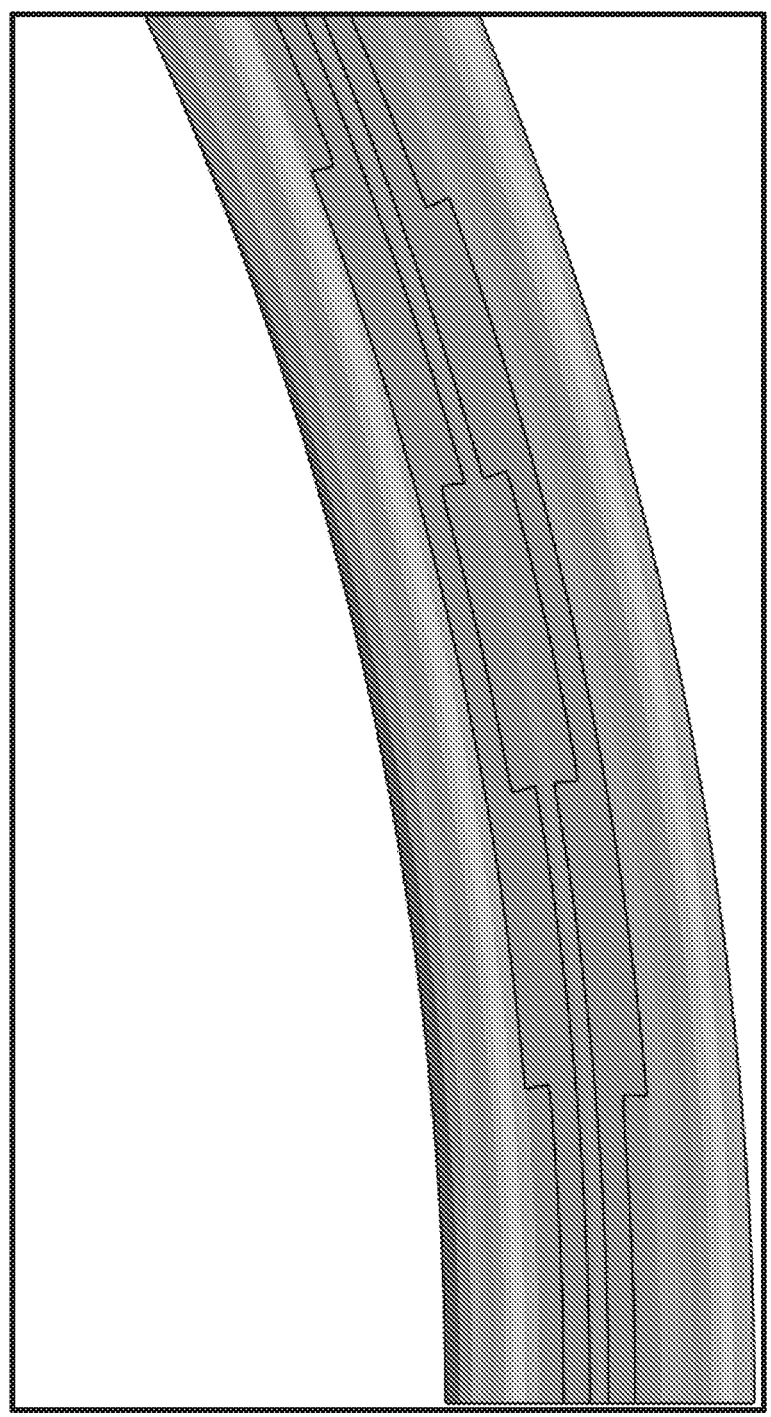
FIG. 6B is a stress graph of the display area with the configuration illustrated in FIG. 6A.
Figure 6C:
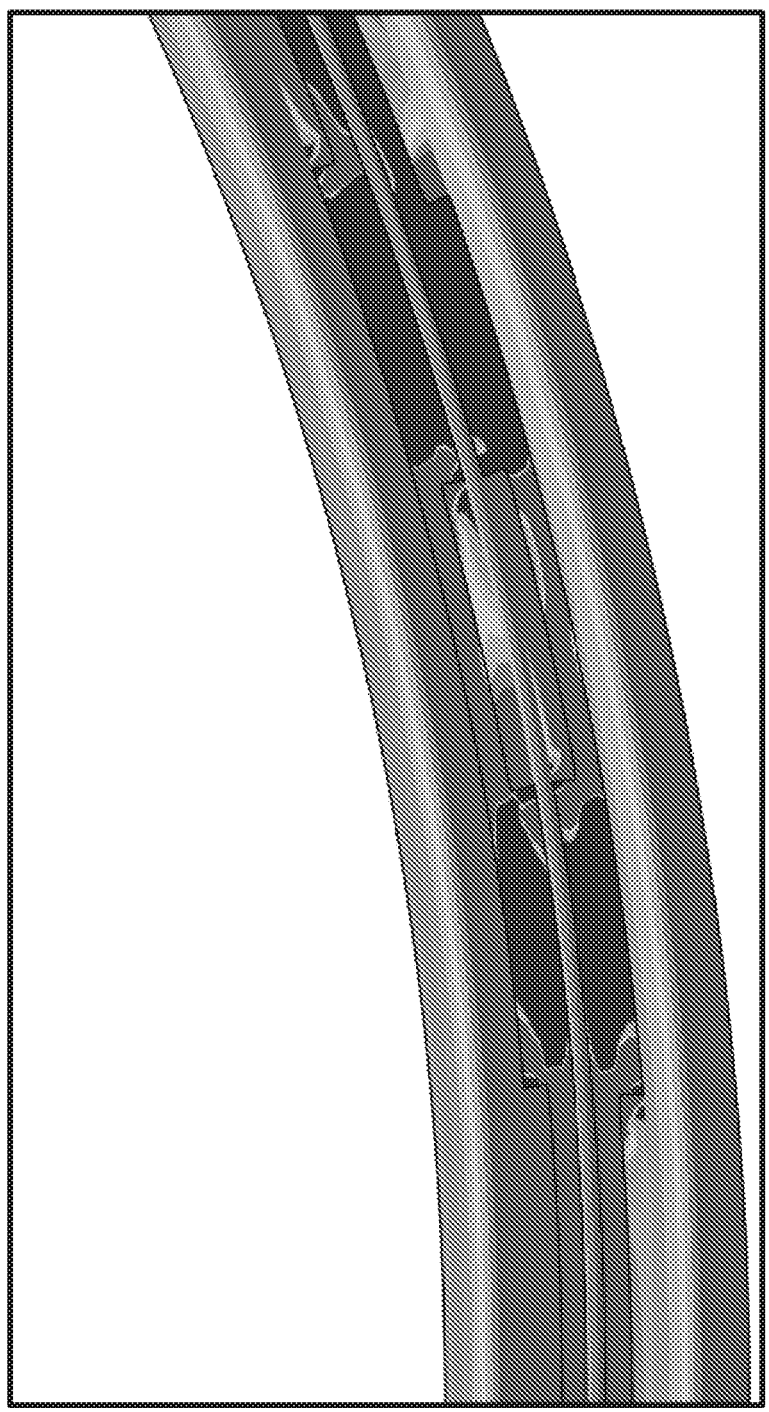
FIG. 6C is a strain graph of the display area with the configuration illustrated in FIG. 6A.
Figure 6D:
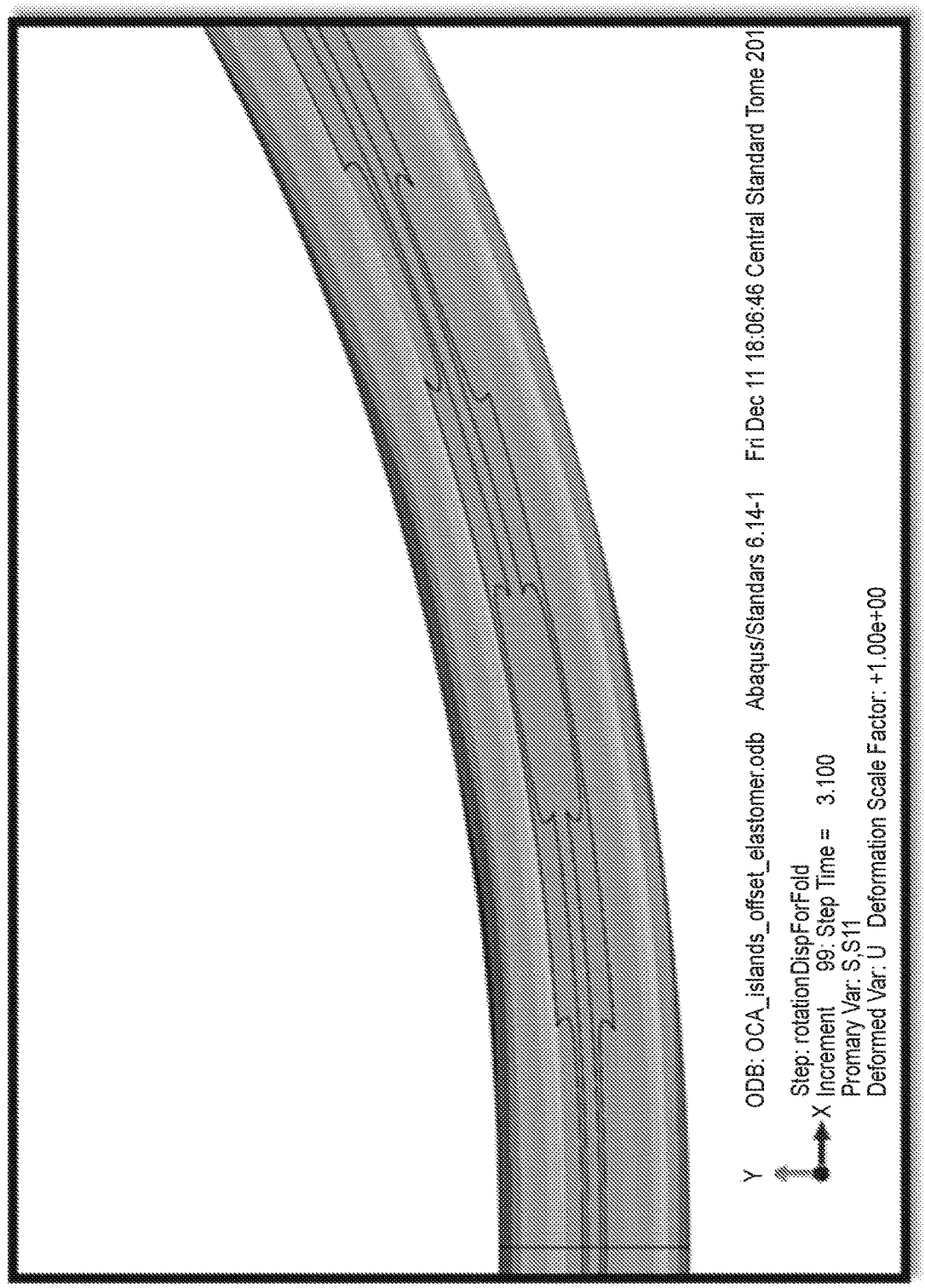
FIG. 6D is a stress graph of the display area with the configuration illustrated in FIG. 6A having an elastomer support layer.
Figure 6E:
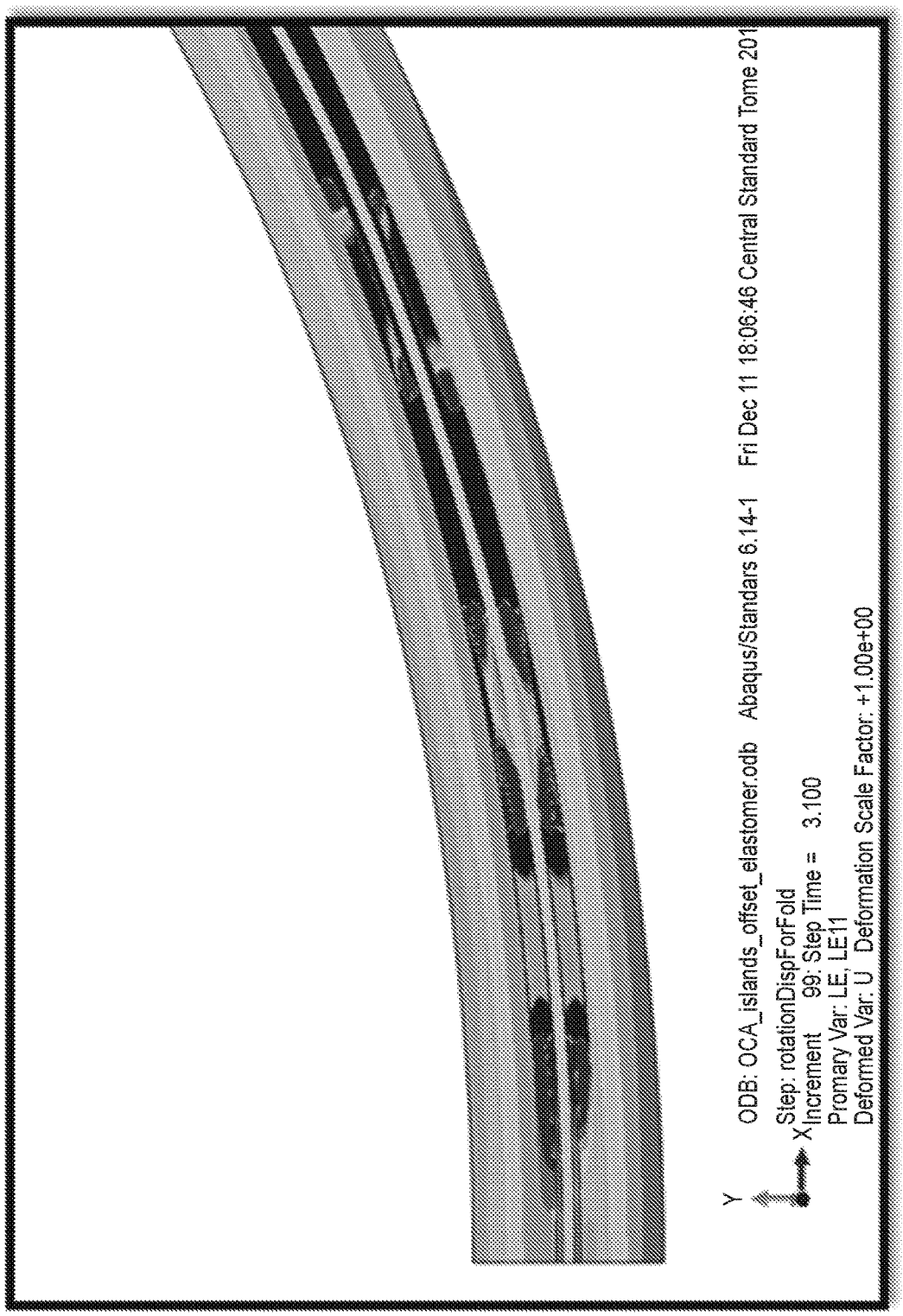
FIG. 6E is a strain graph of the display area with the configuration illustrated in FIG. 6A.
Figure 6F:
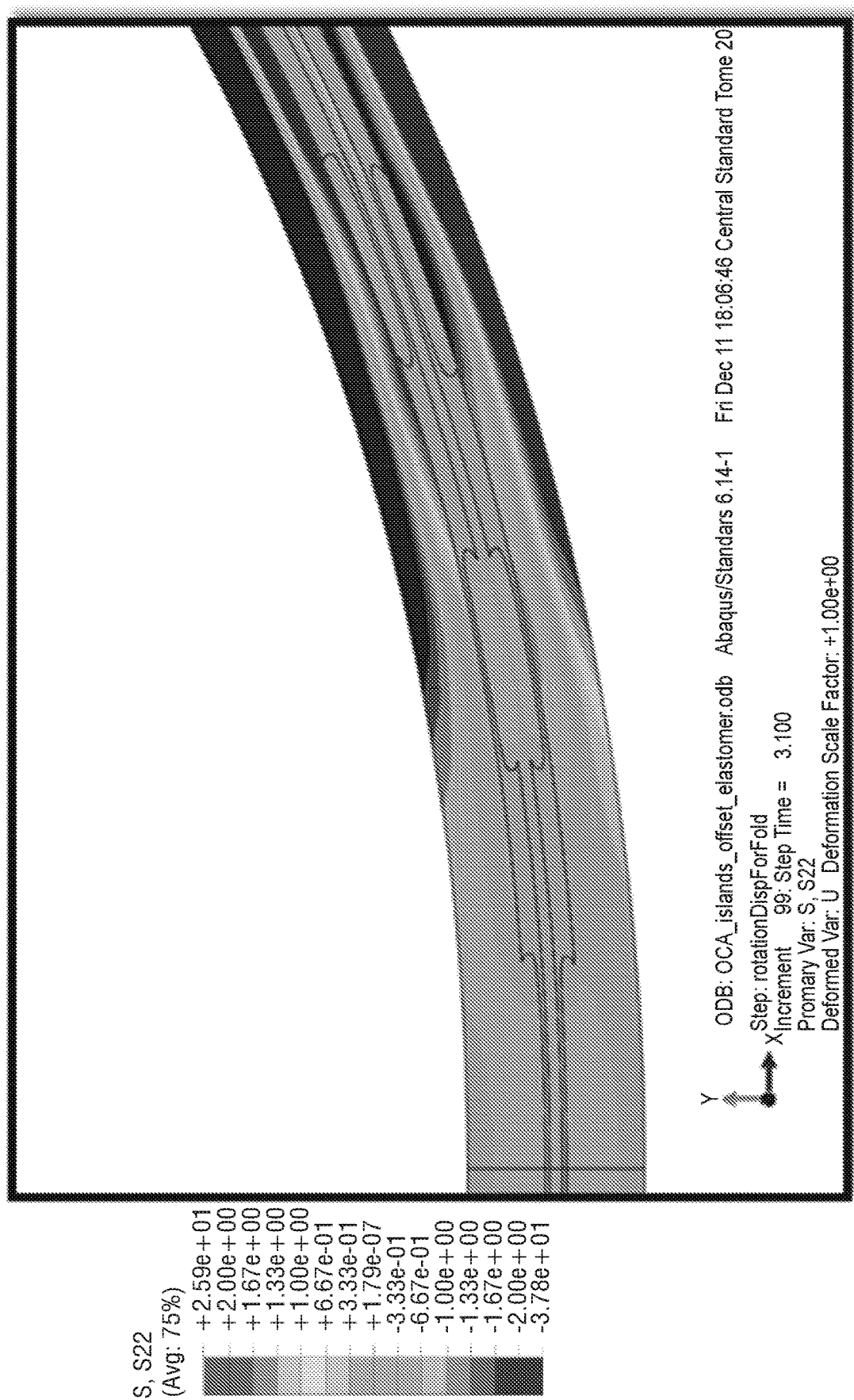
FIG. 6F is a peel stress graph of the display area with the configuration illustrated in FIG. 6A.

FIG. 6A is a close-up view of another example configuration of the display area 410 in FIG. 4. The bonding layer 430 includes a support layer 635, a first set of discrete patches 632, and a second set of discrete patches 634. In the example illustrated in FIG. 6A, the patches in the first set 632 and the second set 634 are disposed in a staggered pattern. The bonding layer 450 includes a support layer 655, a first set of discrete patches 652, and a second set of discrete patches 654. The patches in the first set 652 and the second set 654 are disposed in a staggered pattern. As one example, the support layers (635, 655) may use Optically Clear Laminating Adhesive 8141 or CEF2210 Optically Clear Adhesive from 3M Company of Saint Paul, Minn., and the adhesive patches (632, 634, 652, 654) may use Optically Clear Adhesive 8180 from 3M Company. FIG. 6B is a stress graph of the display area 410 with the configuration illustrated in FIG. 6A using the materials provided in the example; and FIG. 6C is a strain graph of the display area 410 with the configuration illustrated in FIG. 6A. Comparing FIGS. 5C and 6C, the overall strain in the display area with a bonding layer having offset discrete adhesive patches is less than the overall strain in the display area with a bonding layer having aligned discrete adhesive patches. Comparing FIGS. 5E and 6C, the overall strain in the display area with a bonding layer having discrete adhesive patches in a staggered pattern is less than the overall strain in the display area with a continuous adhesive layer as the bonding layer As another example, the support layers (635, 655) may use a soft elastomer with shear modulus of 12 kPa, and the adhesive patches (632, 634, 652, 654) may use Optically Clear Adhesive 8180 from 3M Company. FIG. 6D is a stress graph of the display area 410 with the configuration illustrated in FIG. 6A using the materials provided in the above example; FIG. 6E is a strain graph of the display area 410 with the configuration illustrated in FIG. 6A; and FIG. 6F is a peel stress graph of the display area 410 with the configuration illustrated in FIG. 6A. As illustrated, the overall strain in the display area with a bonding layer having offset discrete adhesive patches is relatively low. Comparing FIGS. 5E and 6E, the overall strain in the display area with a bonding layer having discrete adhesive patches on an elastomer support layer is less than the overall strain in the display area with a continuous adhesive layer as the bonding layer.

EXEMPLARY EMBODIMENTS

Item A1. A bonding layer having a first surface and a second surface opposing the first surface, comprising a support layer, a first set of discrete adhesive patches, and a second set of discrete adhesive patches. Each of the first and the second set of adhesive patches comprises a plurality of adhesive patches. The first set of adhesive patches are disposed on the first surface of the bonding layer and the second set of adhesive patches are disposed on the second surface of the bonding layer.

Item A2. The bonding layer of Item A1, wherein at least some of the first set of discrete adhesive patches and at least a portion of the support layer are optically clear.

Item A3. The bonding layer of Item A1 or A2, wherein at least some of the second set of discrete adhesive patches and at least a portion of the support layer are optically clear.

Item A4. The bonding layer of any one of Item A1-A3, wherein the support layer comprises a soft elastomer.

Item A5. The bonding layer of any one of Item A1-A4, wherein the first set of adhesive patches are disposed on the first surface of the bonding layer in a pattern.

Item A6. The bonding layer of any one of Item A1-A5, wherein the second set of adhesive patches are disposed on the second surface of the bonding layer in a pattern.

Item A7. The bonding layer of any one of Item A1-A6, wherein the first set of adhesive patches are randomly disposed on the first surface of the bonding layer.

Item A8. The bonding layer of any one of Item A1-A7, wherein the second set of adhesive patches are randomly disposed on the second surface of the bonding layer.

Item A9. The bonding layer of any one of Item A1-A8, wherein at least two of the first set of adhesive patches and the second set of adhesive patches are aligned with each other.

Item A10. The bonding layer of any one of Item A1-A9, wherein at least two of the first set of adhesive patches and the second set of adhesive patches are disposed in a staggered pattern.

Item A11. The bonding layer of any one of Item A1-A10, wherein at least a portion of the support layer is not adhesive.

Item A12. The bonding layer of any one of Item A1-A11, wherein at least a portion of the support layer is adhesive.

Item A13. The bonding layer of any one of Item A1-A12, wherein a refractive index of the first set of adhesive patches has an absolute difference less than or equal to 0.05 from a refractive index of the support layer.

Item A14. The bonding layer of any one of Item A1-A13, wherein a refractive index of the second set of adhesive patches has an absolute difference less than or equal to 0.05 from a refractive index of the support layer.

Item A15. The bonding layer of any one of Item A1-A14, wherein the first set or the second set of adhesive patches comprise at least one of structural adhesive, semi-structural adhesive, heat-activated adhesive, pressure-sensitive adhesive, ultra-violet curable adhesive, and thermally curable adhesive.

Item A16. The bonding layer of any one of Item A1-A15, wherein the first set or the second set of adhesive patches are formed having one of a cylindrical shape, a cubic shape, a rectangular shape, a hemispherical shape, an oblong shape, and a prism with elliptical shaped cross-section.

Item A17. The bonding layer of any one of Item A1-A16, wherein the support layer comprises a material having a shear modulus no more than 100 kPa.

Item A18. The bonding layer of any one of Item A1-A17, wherein the first set or the second set of adhesive patches has a shear modulus that is 1 time to 100,000 times of a shear modulus of the support layer.

Item A19. The bonding layer of any one of Item A1-A18, wherein the first set or the second set of adhesive patches comprise a plurality of rows of discrete adhesive patches.

Item A20. The bonding layer of Item A19, wherein at least two of the plurality of rows are generally parallel.

Item A21. The bonding layer of any one of Item A1-A20, wherein at least a portion of the first set of adhesive patches are disposed generally equal spacing between adjacent adhesive patches.

Item B1. A flexible display, comprising a first layer and a second layer, and a bonding layer disposed between the first layer and the second layer. The bonding layer has a first surface and a second surface opposing the first surface. The bonding layer comprises a support layer, a first set of discrete adhesive patches, and a second set of discrete adhesive patches. Each of the first and the second set of adhesive patches comprises a plurality of adhesive patches. The first set of adhesive patches are disposed on the first surface of the bonding layer and the second set of adhesive patches are disposed on the second surface of the bonding layer.

Item B2. The bonding layer of Item B1, wherein at least some of the first set of discrete adhesive patches and at least a portion of the support layer are optically clear.

Item B3. The bonding layer of Item B1 or B2, wherein at least some of the second set of discrete adhesive patches and at least a portion of the support layer are optically clear.

Item B4. The bonding layer of any one of Item B1-B3, wherein the support layer comprises a soft elastomer.

Item B5. The bonding layer of any one of Item B1-B4, wherein the first set of adhesive patches are disposed on the first surface of the bonding layer in a pattern.

Item B6. The bonding layer of any one of Item B1-B5, wherein the second set of adhesive patches are disposed on the second surface of the bonding layer in a pattern.

Item B7. The bonding layer of any one of Item B1-B6, wherein the first set of adhesive patches are randomly disposed on the first surface of the bonding layer.

Item B8. The bonding layer of any one of Item B1-B7, wherein the second set of adhesive patches are randomly disposed on the second surface of the bonding layer.

Item B9. The bonding layer of any one of Item B1-B8, wherein at least two of the first set of adhesive patches and the second set of adhesive patches are aligned with each other.

Item B10. The bonding layer of any one of Item B1-B9, wherein at least two of the first set of adhesive patches and the second set of adhesive patches are disposed in a staggered pattern.

Item B11. The bonding layer of any one of Item B1-B10, wherein at least a portion of the support layer is not adhesive.

Item B12. The bonding layer of any one of Item B1-B11, wherein at least a portion of the support layer is adhesive.

Item B13. The bonding layer of any one of Item B1-B12, wherein a refractive index of the first set of adhesive patches has an absolute difference less than or equal to 0.05 from a refractive index of the support layer.

Item B14. The bonding layer of any one of Item B1-B13, wherein a refractive index of the second set of adhesive patches has an absolute difference less than or equal to 0.05 from a refractive index of the support layer.

Item B15. The bonding layer of any one of Item B1-B14, wherein the first set or the second set of adhesive patches comprise at least one of structural adhesive, semi-structural adhesive, heat-activated adhesive, pressure-sensitive adhesive, ultra-violet curable adhesive, and thermally curable adhesive.

Item B16. The bonding layer of any one of Item B1-B15, wherein the first set or the second set of adhesive patches are formed having one of a cylindrical shape, a cubic shape, a rectangular shape, a hemispherical shape, an oblong shape, and a prism with elliptical shaped cross-section.

Item B17. The bonding layer of any one of Item B1-B16, wherein the support layer comprises a material having a shear modulus no more than 100 kPa.

Item B18. The bonding layer of any one of Item B1-B17, wherein the first set or the second set of adhesive patches has a shear modulus that is 1 time to 100,000 times of a shear modulus of the support layer.

Item B19. The bonding layer of any one of Item B1-B18, wherein the first set or the second set of adhesive patches comprise a plurality of rows of discrete adhesive patches.

Item B20. The bonding layer of Item B19, wherein at least two of the plurality of rows are generally parallel.

Item B21. The bonding layer of any one of Item B1-B20, wherein at least a portion of the first set of adhesive patches are disposed generally equal spacing between adjacent adhesive patches.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A bonding layer having a first surface and a second surface opposing the first surface, comprising:
    a support layer having a shear modulus of no more than about 100 kPa;
    a first set of discrete adhesive patches; and
    a second set of discrete adhesive patches,
    wherein each of the first and the second set of adhesive patches comprises a plurality of adhesive patches, and wherein the first set of adhesive patches are disposed on the first surface of the bonding layer and the second set of adhesive patches are disposed on the second surface of the bonding layer.

2. The bonding layer of claim 1, wherein at least some of the first set of discrete adhesive patches and at least a portion of the support layer are optically clear.

3. The bonding layer of claim 1, wherein the support layer comprises a soft elastomer.

4. The bonding layer of claim 1, wherein the first set of adhesive patches are disposed on the first surface of the bonding layer in a pattern.

5. The bonding layer of claim 1, wherein the second set of adhesive patches are disposed on the second surface of the bonding layer in a pattern.

6. The bonding layer of claim 1, wherein the second set of adhesive patches are randomly disposed on the second surface of the bonding layer.

7. The bonding layer of claim 1, wherein at least two of the first set of adhesive patches and the second set of adhesive patches are aligned with each other.

8. The bonding layer of claim 1, wherein at least two of the first set of adhesive patches and the second set of adhesive patches are disposed in a staggered pattern.

9. The bonding layer of claim 1, wherein a refractive index of the first set of adhesive patches has an absolute difference less than or equal to 0.05 from a refractive index of the support layer.

10. A flexible display, comprising:
a first layer;
a second layer; and
a bonding layer disposed between the first layer and the second layer, the bonding layer having a first surface and a second surface opposing the first surface, comprising:
a support layer having a shear modulus of no more than about 100 kPa;
a first set of discrete adhesive patches; and
a second set of discrete adhesive patches,
wherein each of the first and the second set of adhesive patches comprises a plurality of adhesive patches, and wherein the first set of adhesive patches are disposed on the first surface of the bonding layer and the second set of adhesive patches are disposed on the second surface of the bonding layer.

11. The bonding layer of claim 10, wherein at least some of the first set of discrete adhesive patches and at least a portion of the support layer are optically clear.

12. The bonding layer of claim 10, wherein the support layer comprises a soft elastomer.

13. The bonding layer of claim 10, wherein the first set of adhesive patches are disposed on the first surface of the bonding layer in a pattern.

14. The bonding layer of claim 10, wherein at least two of the first set of adhesive patches and the second set of adhesive patches are aligned with each other.

15. The bonding layer of claim 10, wherein at least two of the first set of adhesive patches and the second set of adhesive patches are disposed in a staggered pattern.

16. The bonding layer of claim 10, wherein a refractive index of the first set of adhesive patches has an absolute difference less than or equal to 0.05 from a refractive index of the support layer.

* * * * *

UNITED STATES PATENT AND TRADEMARK OFFICE
CERTIFICATE OF CORRECTION

PATENT NO. : 10,946,616 B2
APPLICATION NO. : 16/062863
DATED : March 16, 2021
INVENTOR(S) : Everaerts et al.

Page 1 of 1

It is certified that error appears in the above-identified patent and that said Letters Patent is hereby corrected as shown below:

In the Specification

<u>Column 5</u>
Line 61, Delete "l/Pa" and insert -- 1/Pa --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*